Nov. 19, 1957 J. M. CARTER 2,813,977
FREQUENCY MODULATED OSCILLATION GENERATOR
Filed July 26, 1947
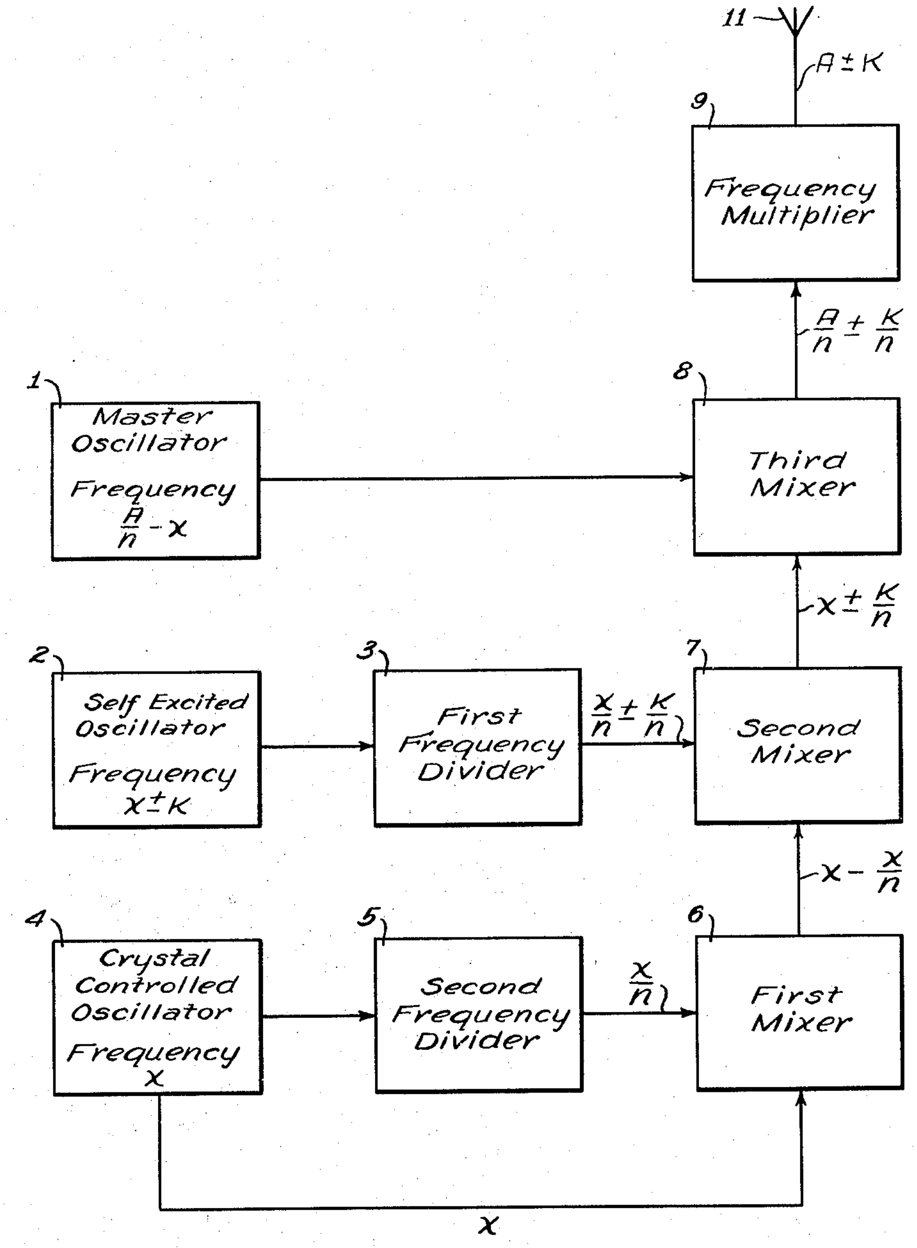
WITNESSES:
Robert C. Baird
Wm. C. Groome
INVENTOR
John M. Carter.
BY F. W. Lyle
ATTORNEY United States Patent Office 2,813,977
Patented Nov. 19, 1957

2,813,977

FREQUENCY MODULATED OSCILLATION GENERATOR

John M. Carter, Baltimore, Md., assignor to Westinghouse Electric Corporation, East Pittsburgh, Pa., a corporation of Pennsylvania Application July 26, 1947, Serial No. 763,890

8 Claims. (Cl. 250—36)

My invention relates to frequency modulated oscillation generators and, in particular, relates to an arrangement for generating frequency modulated oscillations in which the center frequency is maintained unusually constant.

My invention is particularly useful for generating oscillations for radio telegraph systems in which the frequency is shifted from one value which is radiated when a dot or dash is being sent out to a different value in the intervals between dots and dashes. Such systems are frequently referred to as employing frequency-shift keying and they are becoming increasingly important for use in communication work. In accordance with the prior art, such systems usually employ a self-excited oscillator in which the reactance of an excitation circuit is shifted from one specified limit to another whenever the telegraph key is operated to produce a dot or dash. Signals are, accordingly, sent out at one definite frequency when a dot or dash is being radiated, and at a fixed different frequency in the intervals between such dots and dashes. At the receiver, the incoming waves are detected by means of one of the discriminator circuits well known in the art to give a change of output voltage whenever the frequency shifts from one value to the other. This shift in frequency, in accordance with usual modern practice, is a very small percentage of the carrier frequency; hence the frequency stability of both the transmitter and the receiver is very important. In other words, the two frequencies used must be kept extremely constant.

In the types of frequency modulated transmitters used today, the oscillations are first generated at a frequency which is only a small fraction of the frequency ultimately radiated from the antenna. The frequency modulations are introduced at this lower frequency, and the resulting wave is frequency multiplied to a high degree in order to obtain the actual radiated carrier frequency. This means that any unwanted frequency variation in the comparatively low frequency first generated will be multiplied in the frequency multiplier and produce large undesired frequency variations in the radiated energy.

One object of my invention is, accordingly, to provide an arrangement in which the above-mentioned frequency multiplication of the output of the frequency modulated first-oscillator will not result in a multiplication of the frequency instability thereof in the wave radiated from the transmitting antenna.

Another object of my invention is to provide a means for generating frequency modulated oscillations having a desirably wide signal-frequency variation about a center frequency which has a constancy such as is characteristic of modern crystal-controlled oscillation generators.

Still another object of my invention is to provide a frequency modulated telegraph signalling system in which the signal and space frequencies are each substantially constant in value.

Other objects of my invention will become apparent upon reading the following description, taken in connection with the drawing in which the single figure is a schematic block diagram of a system embodying the principles of my invention.

Referring in detail to the drawing, I provide a master oscillator 1 which is arranged to generate a frequency $$\frac{A}{n}-x$$

where A is a constant, $n$ is the multiplication which is to be introduced at the transmitter in order to bring the generated frequency up to the radiated carrier frequency desired, and $x$ is a value which remains constant for any one operating-adjustment of the transmitter, but which may be varied from time to time when it is desired to alter the frequency of the self-excited local oscillator which is to be modulated. While the desirability of varying the value $x$ from time to time makes it inconvenient to make the master oscillator one of the crystal-controlled type, the fact that its frequency is not subjected to shift by the signalling key makes it possible for oscillator 1 to be of a relatively stable frequency type.

The frequency modulations corresponding to the signal are introduced into the system through the agency of a second oscillator 2 which is preferably of the self-excited type and which may be of any sort now well known in the frequency modulation art for use as a frequency modulated oscillator. For example, it may comprise a feedback oscillator having its frequency controlled by a reactance tube, the grid potential of which is varied in value in accordance with the impressed signals. Such oscillators are usually subject to somewhat undesirable instability of their center frequency because of the peculiarities of the circuits introduced by the part of the equipment producing their frequency modulation. The oscillator 2 is designed to generate a center frequency $x$ and to have its frequency shifted by the telegraph key from the value $x+K$ to the value $x-K$, where 2K is the frequency shift desired to be used in the system. K is generally but a very small fraction of $x$.

The output of the oscillator K is first sent through a first frequency divider 3 where its frequency is reduced to $$\frac{x}{n}\pm\frac{K}{n}$$

In this way, any undesired fluctuations in the frequency of the oscillator 2 are divided in value by $n$.

In order to introduce into the system the frequency stability characteristic of crystal-controlled oscillators, I provide the crystal-controlled oscillator 4, one output of which is sent into a second frequency divider 5 where it likewise is reduced in the ratio $n$. The output of the second frequency divider 5 is impressed on a first mixer 6 where it is combined with a frequency $x$ from the output of crystal oscillator 4 to produce an output frequency $$x-\frac{x}{n}$$

The output of first mixer 6 is impressed together with the output of first frequency divider 3 on a second mixer 7 where the two are combined to produce an output $$x\pm\frac{K}{n}$$

The output of second mixer 7 is impressed on a third mixer 8 where it is combined with the output of master oscillator 1 to remove the frequency $x$ therefrom and produce an output of frequency $$\frac{A}{n}\pm\frac{K}{n}$$

The output of the third mixer 8 is sent through the third frequency multipler 9 where it is multipled in frequency by the value $n$ to produce the desired radiated frequency $A \pm K$ which is sent out through antenna 11.

I claim as my invention:

1. In a transmitter for frequency modulated signals, a master oscillator of substantially constant frequency output, a frequency modulated oscillator and a third oscillator, electro-mechanical means for maintaining the frequency of said third oscillator constant, a first frequency divider to produce an output having a frequency equal to that of said frequency modulated oscillator divided by $n$, where $n$ is a constant, a second frequency divider for producing an output having a frequency equal to that of said third oscillator divided by $n$, a first mixer for combining the frequency of said second frequency divider and said third oscillator, a second mixer for combining the outputs of said first frequency divider and said first mixer, a third mixer for combining the outputs of said second mixer and said master oscillator, and means for multiplying the frequency of the output of said third mixer by $n$.

2. In a transmitter for frequency modulated telegraph signals, a master oscillator of substantially constant frequency output, a frequency modulated oscillator and a third oscillator, means for maintaining the frequency of said third oscillator constant, a first frequency divider to produce an output having a frequency equal to that of said frequency modulated oscillator divided by $n$, where $n$ is a constant, a second frequency divider for producing an output having a frequency equal to that of said third oscillator divided by $n$, a first mixer for combining the frequency of said second frequency divider and said third oscillator, a second mixer for combining the outputs of said first frequency divider and said first mixer, a third mixer for combining the outputs of said second mixer and said master oscillator, and means for multiplying the frequency of the output of said third mixer by $n$.

3. In a transmitter for frequency modulated signals, a master oscillator of substantially constant frequency output, a frequency modulated oscillator and a third oscillator, crystal means for maintaining the frequency of said third oscillator constant, a first frequency divider to produce an output having a frequency equal to that of said frequency modulated oscillator divided by $n$, where $n$ is a constant, a second frequency divider for producing an output having a frequency equal to that of said third oscillator divided by $n$, a first mixer for combining the frequency of said second frequency divider and said third oscillator, a second mixer for combining the outputs of said first frequency divider and said first mixer, a third mixer for combining the outputs of said second mixer and said master oscillator, and means for multiplying the frequency of the output of said third mixer by $n$.

4. In a transmitter for frequency modulated telegraph signals, a master oscillator of substantially constant frequency output, a frequency modulated oscillator and a third oscillator, crystal means for maintaining the frequency of said third oscillator constant, a first frequency divider to produce an output having a frequency equal to that of said frequency modulated oscillator divided by $n$, where $n$ is a constant, a second frequency divider for producing an output having a frequency equal to that of said third oscillator divided by $n$, a first mixer for combining the frequency of said second frequency divider and said third oscillator, a second mixer for combining the outputs of said first frequency divider and said first mixer, a third mixer for combining the outputs of said second mixer and said master oscillator, and means for multiplying the frequency of the output of said third mixer by $n$.

5. In combination with an oscillator adjusted to generate a frequency $$\frac{A}{n}-x$$

where A, $n$ and $x$ are constants, a frequency modulated oscillator for generating a frequency $x \pm K$ in response to modulating signals, where K represents the frequency modulation being impressed, a third oscillator adjusted to generate a frequency $x$, frequency-maintaining means to maintain the frequency of said third oscillator constant to a high degree of precision, means energized from said frequency modulated oscillator to produce an output having a frequency $$\frac{x}{n} \pm \frac{K}{n}$$

where $n$ is a constant, means supplied by said third oscillator to produce an output having a frequency $$\frac{x}{n}$$

means to combine the output of frequency $$\frac{x}{n}$$

and the output of said third oscillator to produce an output having a frequency $$x-\frac{x}{n}$$

means to combine the said output of frequency $$x-\frac{x}{n}$$

with said output of frequency $x \pm K$ to produce an output having a frequency $$x \pm \frac{K}{n}$$

means to combine the output of frequency $$x \pm \frac{K}{n}$$

with said output having a frequency $$\frac{A}{n}-x$$

to produce an output having a frequency $$\frac{A}{n} \pm \frac{K}{n}$$

and means energized by the last-mentioned output to produce an output having a frequency $A \pm K$.

6. In combination with an oscillator adjusted to generate a frequency $$\frac{A}{n}-x$$

where A, $n$ and $x$ are constants, a frequency modulated oscillator for generating a frequency $x \pm K$ in response to modulating signals, where K represents the frequency modulation being impressed, a third oscillator adjusted to generate a frequency $x$, crystal means for controlling the frequency of said third oscillator constant to a high degree of precision, means energized from said frequency modulated oscillator to produce an output having a frequency $$\frac{x}{n} \pm \frac{K}{n}$$

where $n$ is a constant, means supplied by said third oscillator to produce an output having a frequency $$\frac{x}{n}$$

means to combine the output of frequency $$\frac{x}{n}$$

and the output of said third oscillator to produce an output having a frequency $$x-\frac{x}{n}$$

means to combine the said output of frequency $$x-\frac{x}{n}$$

with said output of frequency $$\frac{x}{n}\pm\frac{K}{n}$$

to produce an output having a frequency $$x\pm\frac{K}{n}$$

means to combine the output of frequency $$x\pm\frac{K}{n}$$

with said output having a frequency $$\frac{A}{n}-x$$

to produce an output having a frequency $$\frac{A}{n}\pm\frac{K}{n}$$

and means energized by the last-mentioned output to produce an output having a frequency $A\pm K$.

7. The method of producing a carrier wave of frequency A frequency-modulated by an amount $k$ which consists of generating a first current of frequency which differs from $$\frac{A}{n}$$

by an amount $x$, $n$ being a constant, frequency modulating a frequency $x$ by an amount $k$ to produce a second current, and frequency dividing the last-mentioned current by $n$ to produce a third current, producing a fourth current the frequency of which is maintained with precision at the value $x$, frequency dividing a part of said fourth current to produce a fifth current of frequency $$\frac{x}{n}$$

mixing said fourth and fifth currents to derive a sixth current of frequency which differs from $x$ by an amount $$\frac{x}{n}$$

mixing said sixth current with said third current to produce a seventh current having a frequency which differs from $$x \text{ by } \frac{k}{n}$$

and mixing said seventh current and said first current to produce an output current which differs from $$\frac{A}{n} \text{ by } \frac{k}{n}$$

and frequency multiplying said output current by an amount $n$.

8. In a transmitter for frequency modulated signals, a frequency modulated oscillator having a center frequency substantially equal to a first constant, a second oscillator, means for maintaining the frequency of said second oscillator equal to a second constant, a first frequency divider to produce an output having a frequency equal to that of said frequency modulated oscillator divided by $n$, where $n$ is a third constant, a master oscillator having a substantially constant frequency output equal to the desired transmitter radiation frequency divided by $n$ less a fourth constant, a second frequency divider for producing an output having a frequency equal to that of said second oscillator divided by $n$, a first mixer for combining the frequency of said second frequency divider and said second oscillator, a second mixer for combining the outputs of said first frequency divider and said first mixer, a third mixer for combining the outputs of said second mixer and said master oscillator, and means for multiplying the frequency of the output of said third mixer by $n$.

References Cited in the file of this patent

UNITED STATES PATENTS

| | | |
|---|---|---|
| 2,131,558 | Granger | Sept. 27, 1938 |
| 2,149,829 | Beers | Mar. 7, 1939 |
| 2,407,213 | Tunick | Sept. 3, 1946 |